Figure 3:
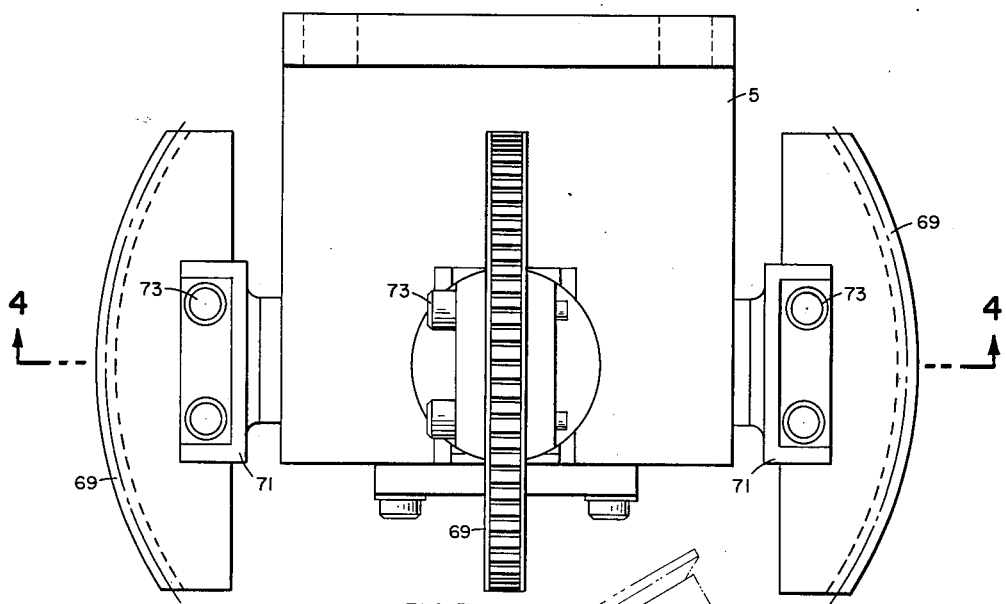

Nov. 23, 1965     E. P. FREER     3,219,304

TWO AXIS LEVELING DEVICE

Filed June 18, 1964     3 Sheets-Sheet 1

Edgar P. Freer,
*INVENTOR.*

Nov. 23, 1965  E. P. FREER  3,219,304

TWO AXIS LEVELING DEVICE

Filed June 18, 1964  3 Sheets-Sheet 3

Edgar P. Freer,
INVENTOR.

United States Patent Office 3,219,304
Patented Nov. 23, 1965

3,219,304
TWO AXIS LEVELING DEVICE
Edgar P. Freer, Phoenix, Ariz., assignor, by mesne assignments, to the United States of America as represented by the Secretary of the Army
Filed June 18, 1964, Ser. No. 376,282
10 Claims. (Cl. 248—346)

This invention relates to a two axis leveling device for leveling an instrument when mounted on a platform of the device.

In a weapon system, the need has arisen for an adjusting means by which a platform, which is adapted to have an instrument mounted thereon, can be quickly and accurately adjusted to a level position.

Therefore, it is an object of this invention to provide a leveling device which includes an adjusting means for quickly and accurately adjusting a platform to a level position.

Another object of this invention is to provide a leveling device which has two fixed axes so arranged as to be capable of adjusting a platform on a head assembly plus or minus 30° in any direction from the vertical center line of a base head assembly.

A further object of this invention is to provide a leveling device which has two axes, either of which can be adjusted as much as plus or minus 30° without affecting the other axis.

Still another object of this invention is to provide a leveling device which has an adjusting means that is in effect a "ball socket" that is always locked in whatever position it is adjusted to.

Yet another object of this invention is to provide a two axis leveling device which has no "cross talk" error between the two axes.

In accordance with this invention, a new leveling device is provided that includes a fixed base head and a movable gimbal head that are interconnected by a mechanical gear adjusting means in such a manner that the movable gimbal head can be adjusted relative to the fixed base head and thereby adjust a platform on the gimbal head to a level position.

Figure 1:
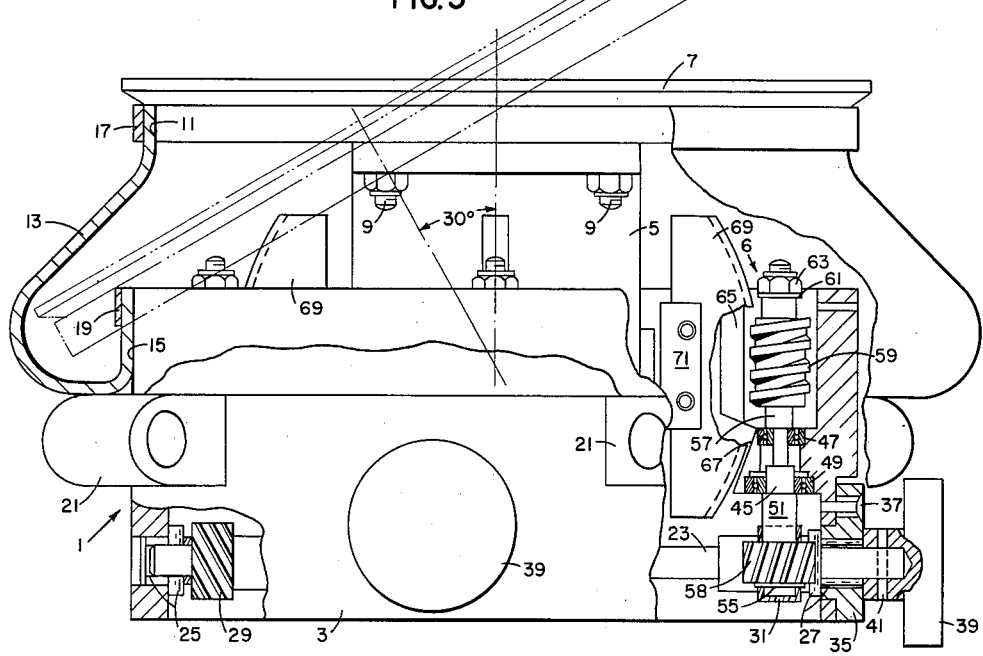
Figure 2:
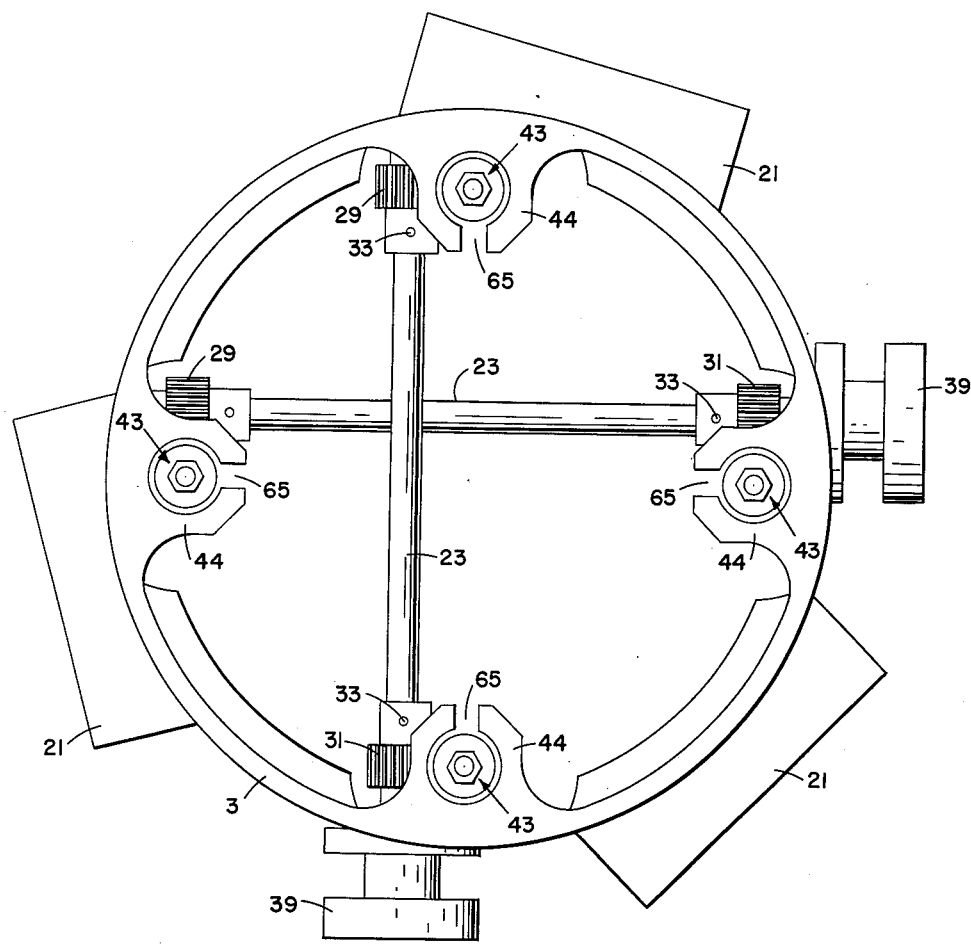
Figure 5:
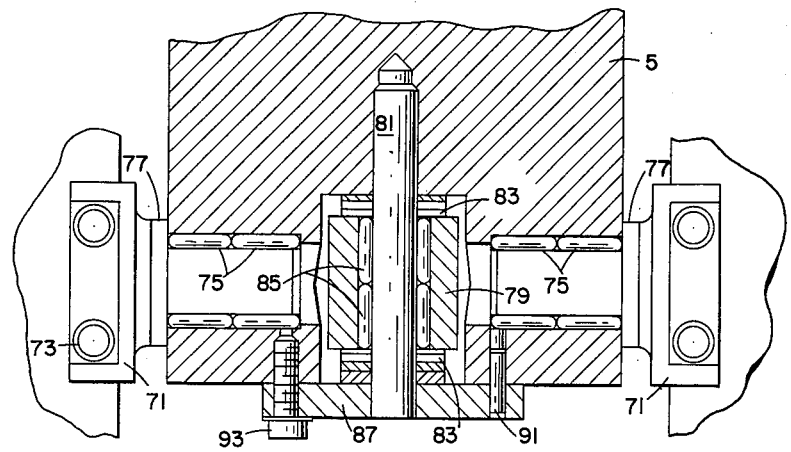
Figure 4:
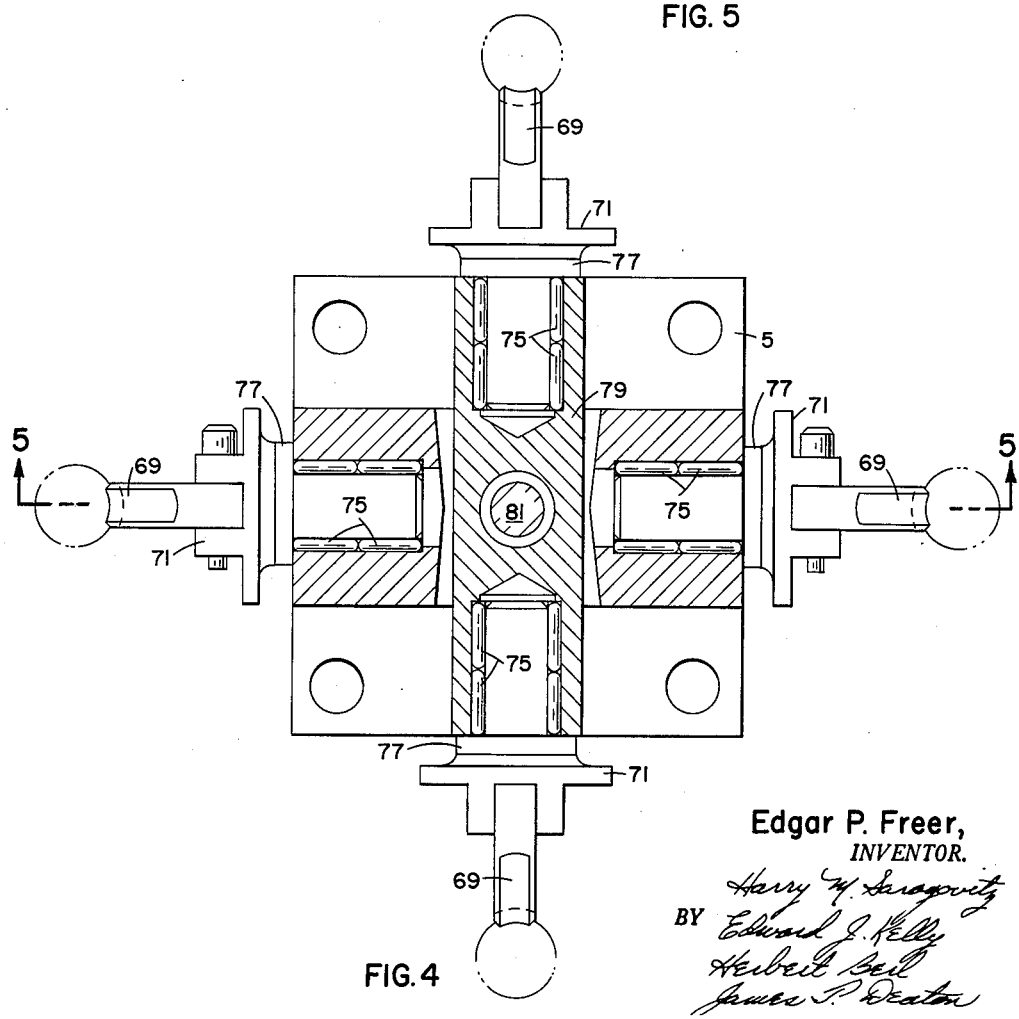

The invention may be better understood by referring to the drawing forming part of this specification, and in which like numerals are employed to designate corresponding parts throughout the same, and wherein:

FIGURE 1 is a plan view, partially cut away and in section, of a two axis leveling device according to the invention, FIGURE 2 is a plan view of a base head according to the invention, FIGURE 3 is a side view of a gimbal head according to this invention, FIGURE 4 is a sectional view taken on line 4—4 of FIGURE 3, and FIGURE 5 is a sectional view taken on line 5—5 of FIGURE 4.

This invention may be better understood by referring to the drawing wherein, numeral 1 designates a two axis leveling device which includes a fixed base head 3 and a movable gimbal head 5. Base head 3 and gimbal head 5 are mounted for movement relative to each other by an adjusting means 6 which is partially mounted on base head 3 and partially on gimbal head 5. Gimbal head 5 has a mounting plate 7 connected thereto by bolts 9. Mounting plate 7 includes a cylindrical surface 11 which receives the upper end of a dust shirt 13. The lower end of dust shirt 13 is received on a cylindrical surface 15 of base head 3, and bands 17 and 19 clamp the upper and lower ends of dust shirt 13 to surfaces 11 and 15 respectively.

Base head 3 is provided with a plurality of brackets 21 for mounting base head 3 on a tripod.

Adjusting means 6 includes a pair of drive shafts 23 that are rotatably mounted in said base head, at one end by means of a needle bearing and thrust bearing arrangement 25 and at the other end by a needle bearing and thrust bearing arrangement 27. A left hand helical gear 29 is mounted on each said drive shaft at said one end, and a right hand helical gear 31 is mounted on each said drive shaft at said other end, and each of said gears are mounted on said drive shaft by means including a pin 33 so as to limit axial movement of drive shafts 23 relative to base head 3. The needle bearing of assembly 27 is mounted in a removable retainer 35 that is secured to base head 3 by screws 37. Each drive shaft 23 has a control knob 39 secured thereto by pin 41 so as to provide a means by which the shafts may be turned and adjusted.

Adjusting means 6 also includes four worm drives 43 (see FIG. 2) which are mounted in bosses 44 on base head 3. Each worm drive includes a worm shaft 45 that is rotatably mounted in base head 3 by means including bearings 47 and 49. The lower end of worm shaft 45 receives a spacer 51 thereon and a helical gear 58 that is nonrotatably connected in a conventional manner to worm shaft 45. A retaining ring 55 is received in a groove in the periphery of worm shaft 45 to retain helical gear 58 and spacer 51 on worm shaft 45. A spacer 57 is positioned on the upper end of worm shaft 45, and a worm 59 is non-rotatably mounted in a conventional manner on worm shaft 45. A washer 61 is received on worm shaft 45, and a nut 63 is threaded on to the upper end of worm shaft 45 to retain worm 59 in position on the worm shaft. Each boss 44 has an opening 65 to the side of worm 59 and a slanted surface 67 (see FIG. 1) below worm 59 to accommodate and guide worm wheel segments 69 which are mounted on gimbal head 5 for cooperation with worms 59. Each worm wheel segment 69 is mounted on a segment arm 71 by screws 73. Two of the segment arms 71 are rotatably connected to gimbal head 5 by needle bearing 75 and thrust bearings 77. The other two segment arms are rotatably connected to gimbal arm 79 by needle bearings 75 and thrust bearings 77. Gimbal arm 79 is pivotably connected to gimbal head 5 by gimbal pin 81, thrust bearings 83, needle bearings 85 and a retaining gimbal head cap 87 that is retained in position by pin 91 and screw 93.

Base head 3 and gimbal head 5 are assembled together by meshing worm wheel segments 69 with worms 59. This meshing of worms 59 and worm wheel segments 69 restrains gimbal head 5 axially relative to base head 3, and rotational restraint is provided by coaction between worm wheel segments 69 and openings 65 of the bosses.

In operation, after gimbal head 5 has been assembled to base head 3 by meshing worm wheel segments 69 with worms 59, leveling of platform 7 on gimbal head 5 is accomplished by rotating control knobs 39 either clockwise or counterclockwise, depending on the direction of rotation required for leveling, thereby driving the worm shafts through the helical gears. Since the segment arms 71 on the gimbal head are mounted on a common axis and the segment arms 71 on the gimbal arm are likewise mounted on a common axis, each control knob 39 operates a single axis of leveling, and each axis may be leveled either separately or concurrently plus or minus 30° from a vertical center line of the base head as illustrated in FIGURE 1. It is also pointed out that the adjusting means is to designed due to the gears used that the movable gimbal head is locked in whatever position adjusted to and that due to the gearing arrangement utilized, the adjusting means in effect acts like a "ball socket" in that it can be adjusted in any direction by appropriately adjusting control knobs 39.

It is to be understood that the form of my invention, herewith shown and described, is to be taken as a preferred example of the same, and that various changes in the shape, size, and arrangement of parts may be resorted to, without departing from the spirit of my invention, or the scope of the subjoined claims.

I claim:

1. A leveling device including: a fixed base head; a movable gimbal head; and mechanical gear adjusting means inter-connecting said fixed base head and said movable gimbal head, said mechanical gear adjusting means including a plurality of equally spaced gear means mounted about intersecting axes on said movable gimbal head for movement therewith, gear means mounted on said fixed base head and intermeshing with the gear means on said movable gimbal head to provide the inter-connection and support of the fixed base head with the movable gimbal head, said gear means intermeshing in such a manner that adjustment of said gear means on said fixed base head causes said movable gimbal head and the gear means thereon to be tilted simultaneously and adjustable to a level position plus or minus 30° from a vertical center line of said base head.

2. A leveling device including: a fixed base head; a movable gimbal head; and mechanical gear adjusting means interconnecting said fixed base head and said movable gimbal head for adjustment of said movable gimbal head relative to said fixed base head, said mechanical gear adjusting means including four worms and four worm wheel segments, said worms being mounted on said base head and said worm wheel segments being mounted on said movable gimbal head and in intermeshing relationship with the worms to provide the sole support of said movable gimbal head relative to said fixed base head and so constructed and arranged relative to said fixed base head and said movable gimbal head as to have characteristics of a ball and socket connection which is always locked in the position to which it is adjusted.

3. A leveling device as set forth in claim 2, wherein a dust skirt is connected to said gimbal head and said base head to protect the gears from dust.

4. A two axis leveling device including: a gimbal head; a gimbal arm pivotably mounted on said gimbal head; first and second worm wheel segments rotatably mounted on said gimbal arm and on a common axis; third and fourth worm wheel segments mounted on said gimbal head and on a common axis which intersects the common axis of said gimbal arm; a base head; and gearing means mounted on said base head and in meshing relationship with said worm wheel segments, whereby said gimbal head is adapted to be adjusted by said gearing means relative to said base head.

5. A two axis leveling device as set forth in claim 4 wherein said gearing means includes, a pair of drive shafts that are mounted perpendicular to each other, each of said drive shafts having two spaced apart gears thereon, four worm shafts mounted perpendicular to said drive shafts, a worm on one end of each of said worm shafts in meshing engagement with one of said worm wheel segments, and a gear on the other end of each of said worm shafts in mating meshing engagement with one of said gears on said drive shafts.

6. A two axis leveling device as set forth in claim 5, wherein the gear on the other end of each of said worm shafts is a helical gear, and the gears on said drive shafts are helical gears.

7. A two axis leveling device, for leveling an instrument, including: a base head, said base head having a peripheral surface with mounting brackets thereon for mounting said base head on a tripod; a pair of drive shafts rotatably mounted perpendicular to each other in said base head; each drive shaft having an end that projects outwardly from the base head and having a control knob mounted thereon, each drive shaft having two gears mounted thereon, one of said gears being a right hand gear and the other a left hand gear; four worm drives rotatably mounted in said base head, each worm drive having a worm mounted on one end and a gear on the other end that meshes with one of the gears on said drive shafts; a movable gimbal head with a platform thereon; a gimbal arm pivotably mounted on said gimbal head and having an axis that is generally perpendicular to and intersects an axis across said gimbal head; and four worm wheel segments, two of which are rotatably mounted along said axis of said gimbal arm and the other two of which are rotatably mounted along said axis across said gimbal head, said worm wheel segments being mounted in meshing engagement with the worms on said worm shafts, whereby said platform on said gimbal head may be adjusted to a level position by adjusting said control knobs in the appropriate direction.

8. A two axis leveling device as set forth in claim 7, wherein a dust shirt is connected to said gimbal head and said base head to protect the gears from dust.

9. A two axis leveling device including: a gimbal head; a platform mounted on said gimbal head; four worm wheel segments mounted on said gimbal head, said worm wheel segments being located on two axes which intersect each other and are generally perpendicular to each other; a base head; and gearing adjusting means mounted on said base head and in meshing relationship with the worm wheel segments, for adjusting the platform on said gimbal head to a level position.

10. A two axis leveling device as set forth in claim 9, wherein said gearing adjusting means includes four worm gears in driving engagement with said four worm wheel segments and helical gear driving means connected to said worm gears.

References Cited by the Examiner

UNITED STATES PATENTS

| | | | |
|---|---|---|---|
| 2,293,593 | 8/1942 | Clark | 248—404 |
| 2,294,437 | 9/1942 | Allen et al. | 248—184 |
| 2,582,779 | 1/1952 | Hoge | 248—183 |
| 2,869,418 | 1/1959 | Miller et al. | 88—14 |

FOREIGN PATENTS 515,936  12/1939  Great Britain.

CHANCELLOR E. HARRIS, *Primary Examiner.*

CLAUDE A. LE ROY, *Examiner.*